United States Patent [19]

Mori et al.

[11] E Re. 30,676

[45] Reissued Jul. 14, 1981

[54] FLAME RESISTANT POLYURETHANE FOAM AND PROCESS FOR PRODUCING THE SAME

[75] Inventors: Shigeo Mori; Takeshi Fujita, both of Kyoto, Japan

[73] Assignee: Dai-Ichi Kogyo Seiyaku Co., Ltd., Kyoto, Japan

[21] Appl. No.: 110,501

[22] Filed: Jan. 8, 1980

Related U.S. Patent Documents

Reissue of:

[64] Patent No.: 4,088,614
Issued: May 9, 1978
Appl. No.: 645,172
Filed: Dec. 29, 1975

U.S. Applications:

[63] Continuation of Ser. No. 483,339, Jun. 26, 1974, abandoned.

[30] Foreign Application Priority Data

Jun. 26, 1973 [JP] Japan ..... 48-72463
Oct. 1, 1973 [JP] Japan ..... 48-110799

[51] Int. Cl.[3] ..... C08G 18/14; C08G 18/18; C08G 18/20; C08G 18/32

[52] U.S. Cl. ..... 521/110; 564/57; 564/58; 564/59; 564/60; 521/128; 521/129; 521/163; 521/164; 521/166; 260/192; 260/293.87; 260/293.9; 260/453 RW; 260/465 R; 260/465 E; 260/465.5 R; 260/465.6; 260/465.8 R; 260/584 A; 260/584 B; 544/180; 544/357; 564/17; 564/37; 564/45; 564/47

[58] Field of Search ..... 521/110, 128, 129, 163, 521/164, 166

[56] References Cited

U.S. PATENT DOCUMENTS

| | | | |
|---|---|---|---|
| 2,953,533 | 9/1960 | Khawam | 260/2.5 AM |
| 3,175,025 | 3/1965 | Geen | 264/80 |
| 3,175,030 | 3/1965 | Geen | 264/321 |
| 3,221,016 | 11/1965 | Currier et al. | 260/2.5 AM |
| 3,476,933 | 11/1969 | Mendelsohn | 260/2.5 AC |
| 3,681,273 | 8/1972 | Kelly | 260/2.5 AM |
| 3,730,919 | 5/1973 | McGinn | 260/2.5 AZ |
| 4,143,003 | 3/1979 | Haas et al. | 521/129 |

OTHER PUBLICATIONS

Vollmert, "Polymer Chemistry," (Springer-Verlag) 1973, p. 240.

Billmeyer, "Textbook of Polymer Science," 2nd Ed., (Wiley, N.Y.) 1971, pp. 480–482.

*Primary Examiner*—H. S. Cockeram

*Attorney, Agent, or Firm*—Sughrue, Rothwell, Mion, Zinn and Macpeak

[57] ABSTRACT

A process for producing a flame resistant rigid polyurethane foam by reacting a reaction mixture comprising a polyetherpolyol and/or a polyesterpolyol having an active hydrogen atom, a polyisocyanate, water and/or a volatile foaming agent and an emulsifying agent, in which a specific amine compound shown by the general formula as defined hereinafter in the specification is added to the reaction system, the weight ratio of amine compound to polyetherpolyol and/or polyesterpolyol being from 70:30 to 30:70, and also the flame resistant rigid polyurethane foam produced by the process.

17 Claims, No Drawings

FLAME RESISTANT POLYURETHANE FOAM AND PROCESS FOR PRODUCING THE SAME

Matter enclosed in heavy brackets [ ] appears in the original patent but forms no part of this reissue specification; matter printed in italics indicates the additions made by reissue.

This is a continuation of application Ser. No. 483,339 filed June 26, 1974, and now abandoned.

BACKGROUND OF THE INVENTION

1. Field of the Invention

The present invention relates to a process of producing a rigid polyurethane foam haing flame resistance and more particularly, it relates to a process for producing a rigid polyurethane foam having flame resistance tance and unaccompanied by a reduction in the properties of the polyurethane foam or by the formation of scorching. The invention further relates to a flame resistant rigid polyurethane produced by such a process. The term "rigid polyurethane foam" used herein refers to a foam which loses its original rigidity when the foam is compressed to a compression ratio more than 50% due to the rupture of cells. The rigidity of a given foam is generally indicated by a rigidity at a 10% compression ratio.

2. Description of the Prior Art

Polyurethane foams have hitherto been used in a large number of fields due to their specific properties but have a serious disadvantage in that polyurethane foams are easily flammable.

Recently, however, regulations on the extent for rendering polyurethane materials flame retardant or flame resistant have become more and more severe, and this property is particularly important in the application thereof in the fields of automobiles, railway vehicles, aircraft, etc.

The rendering of flame-retarding properties or flame resistance to polyurethane foams is an important problem as described above, but it has not yet been solved by conventional techniques. The methods which have been industrially employed at present still have a large number of difficulties.

Some techniques for rendering polyurethane foams flame retardant are described in the specifications of, e.g., Japanese Pat. Publication Nos. 1750/'63; 9197/'70, 349/'64; 4846/'64; 8696/'64; 26335/'71; 21358/'69; 13037/'66; 2269/'71; Belgian Pat. No. 723,246; U.S. Pat. Nos. 3,262,894; 3,309,342; 3,385,900; 3,402,132; 3,407,150; 3,455,850; 3,530,205; and 3,535,406; British Pat. Nos. 918,636; 954,712; 999,588; and 1,043,832; etc., but these techniques are insufficient for satisfying the necessary requirements.

For example, Japanese Pat. Publn Nos. 1750/'63; 9197/'70; etc., disclose the use of phosphorus-containing compounds or halogen-containing compounds as flame retarders for polyurethane foams but, in such known techniques the phosphorus-containing compound must be added to such an extent that the content of phosphorus in the foam is higher than 1% or the flame retarder must be blended so that the content thereof is 5 to 30% by weight of the polyurethane foam. As a result of using such a large amount of flame retarder, the properties of the polyurethane foam are degraded, for example, the hardness is reduced, the strength is reduced, etc. Furthermore, when the polyurethane material is foamed excessively, the so-called scorching phenomenon occurs which lowers the commercial value of the article. Moreover, since in such cases the concentration of the flame retarder is high, the flame retarder tends to volatilize away due to the action of heat or with the passage of time, which results in a reduction in the flame-proofing or flame-resisting effects. In order to prevent the formation of such scorching, the content of the flame retarder must be reduced to as small an amount as possible. Therefore, the development of a foaming technique which can render polyurethane foams flame retardant using as little an amount of flame retarder as is possible or without using any flame retarder has been highly desired.

As described above, an important problem has been to improve the flame resistance of the polyurethane foam by blending a halogen-containing or phosphorus-containing compound in an amount as small as possible.

The extent of the reduction of the amount of retarder depends upon the extent of flame resistance required in the polyurethane foam and the properties of the flame retarder used, but it is preferred that the amount be as small as possible and further it is most preferred that a flame retarder not be used at all.

SUMMARY OF THE INVENTION

With such in mind, the inventors have investigated and as the result of their investigations have discovered that rigid polyurethane foam having excellent flame resistance with less reduction in the desired properties thereof can be produced using a greatly reduced amount of a flame retarder or without using any flame retarder by blending the raw materials for producing the polyurethane with a specific amine compound.

Thus, according to the present invention a process of producing a flame resistant rigid polyurethane foam is provided which comprises reacting a mixture of a polyetherpolyol and/or a polyesterpolyol having an active hydrogen atom, a polyisocyanate, water and/or a volatile foaming agent as a foaming agent, and an emulsifying agent and containing in the reaction system at least one amine compound represented by any one of the following general formulae (I), (II), (III), (IV), (V), (VI), and (VII):

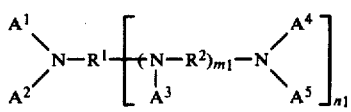

(I)

wherein $A^1$, $A^2$, $A^3$, $A^4$, and $A^5$ each represents a hydrogen atom or a monovalent organic group, wherein at least one of $A^1$ to $A^5$ being a hydrogen atom or an organic group which contains a hydrogen atom active to an isocyanate group; $R^1$ is a divalent organic group, a trivalent organic group or a tetravalent organic group; $R^2$ represents a divalent organic group; $m_1$ represents 0 or a positive integer smaller than 8; and $n_1$ represents 1, 2 or 3;

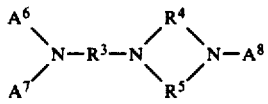

(II)

wherein $A^6$, $A^7$, and $A^8$ each represents a hydrogen atom or a monovalent organic group, with at least one of $A^6$ to $A^8$ being a hydrogen atom or an organic group which contains a hydrogen atom active to an isocyanate group; $R^3$, $R^4$ and $R^5$ each represents a divalent organic group;

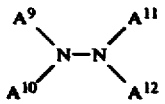

(III)

wherein $A^9$, $A^{10}$, $A^{11}$, and $A^{12}$ each represents a hydrogen atom or a monovalent organic group, with at least one of $A^9$ to $A^{12}$ being a hydrogen atom or an organic group which contains a hydrogen atom active to an isocyanate group;

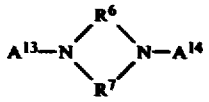

(IV)

wherein $A^{13}$ and $A^{14}$ each represents a hydrogen atom or a monovalent organic group, with at least one of $A^{13}$ and $A^{14}$ being a hydrogen atom or an organic group which contains a hydrogen atom active to an isocyanate group and $R^6$ and $R^7$ each represents a divalent organic group;

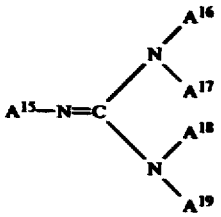

(V)

wherein $A^{15}$, $A^{16}$, $A^{17}$, $A^{18}$, and $A^{19}$ each represents a hydrogen atom or a monovalent organic group, with at least one of $A^{15}$ to $A^{19}$ being a hydrogen atom or an organic group which contains a hydrogen atom active to an isocyanate group;

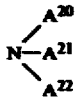

(VI)

wherein $A^{20}$, $A^{21}$ and $A^{22}$ each represents a hydrogen atom or a monovalent organic group, with at least one of $A^{20}$ to $A^{22}$ being a hydrogen atom or an organic group which contains a hydrogen atom active to an isocyanate group;

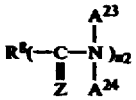

(VII)

wherein $R^6$ represents a hydrogen atom, a monovalent organic group, a divalent organic group, or a trivalent organic group; $A^{23}$ and $A^{24}$ each represents a hydrogen atom or a monovalent organic group, at least one of the $R^8$, $A^{23}$, and $A^{24}$ being a hydrogen atom or a group having a hydrogen atom active to an isocyanate group; Z represents an oxygen atom or a sulfur atom; and $n_2$ is an integer of 1 to 3.

Furthermore, according to this invention, a flame resistant rigid polyurethane foam produced by the aforesaid process is provided. By the process of this invention, it becomes possible to produce a rigid polyurethane foam having high flame-resisting properties unaccompanied by the occurrence of scorching due to decreasing the amount of flame retarder to such an extent that has been considered to be impossible to provide flame resisting properties using conventional techniques.

DETAILED DESCRIPTION OF THE INVENTION

A feature common to the amine compounds represented by aforesaid general formulae (I)–(VII) is that they contain a hydrogen atom active to an isocyanate group. A feature of the present invention lies in the discovery that by adding the aforesaid amine compound to the reaction system used in the production of polyurethane foam, the amine compound is introduced in the molecular structure of the polyurethane foam and in this case by properly controlling the reaction of the active hydrogen atom in the amine compound with the isocyanate group, the polymer chain of the foam has excellent flame-resisting properties. The control of the reaction between such an active hydrogen atom and an isocyanate group in this invention can be attained by permitting nitrogen atoms to exist in the same molecule relative to the active hydrogen atom. That is, it is believed that the reaction is controlled favorably by a catalytic activity of the lone electron pair (the electron pair which does not contribute to the covalent bond) of the nitrogen atom present in the same molecule.

Examples of monovalent groups represented by $A^1$ to $A^5$ include saturated or unsaturated alkyl groups, aryl groups, alicyclic groups and substituted alkyl, aryl and alicyclic groups. In this case, the number of carbon atoms of the alkyl group can range from 1 to 22 and the number of carbon atoms forming the ring of the alicyclic group can range from about 3 to 6. Examples of suitable substituents are an amino group, a hydroxyl group, a cyano group, a halogen atom, a mercapto group and the like.

Furthermore, specific examples of the organic groups represented by $A^1$ to $A^5$ are organic groups including

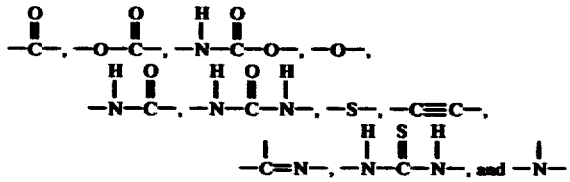

groupings in their structure. Suitable such groups are, for example,

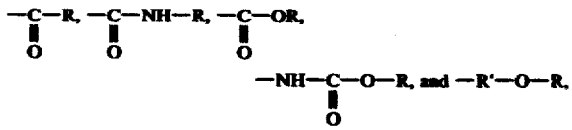

wherein R represents a saturated or unsaturated lower alkyl group or an aryl group and R′ represents a saturated or unsaturated lower alkylene group having, preferably, 1 to 22 carbon atoms.

Suitable examples of the organic groups of $A^1$ to $A^5$ are $-CH_3$, $-CH_2CH_3$, $-C_3H_7$, $-C_4H_9$, $-C_{17}H_{35}$, $-CH_2CH_2C{\equiv}N$, $-CH_2CH_2OH$, $-CH_2CH_2SH$, $-CH_2CH_2-\overset{O}{\overset{\|}{C}}-CH_3$, $-CH_2CH{=}CH_2$, $-CH{=}CHCH_2OH$, 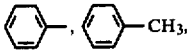 , 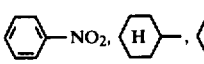 , $-CH_2CH_2-\overset{O}{\overset{\|}{C}}-OCH_3$, $-CH_2CH_2-\overset{O}{\overset{\|}{C}}-CH_3$, $-CH_2CH_2O-\overset{O}{\overset{\|}{C}}-NH-$, $-CH_2CH_2-O-CH_2CH_2OCH_3$, $-\overset{O}{\overset{\|}{C}}-C_5H_{17}$ and the like.

Examples of the divalent organic group represented by $R^1$ and $R^2$ in the general formula (I) are a saturated or unsaturated alkylene group, an arylene group, a divalent alicyclic group, and substituted groups of these groups, the alkylene group having about 1 to 22 carbon atoms and the number of carbon atoms forming the ring of the alicyclic group being about 3 to 6. Specific examples of suitable divalent organic groups are as follows:

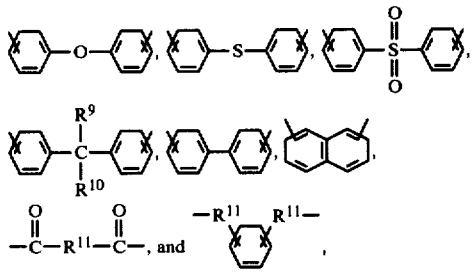

wherein $R^9$ and $R^{10}$ each represents a hydrogen atom or a lower alkyl group having, preferably, 1 to 8 carbon atoms, and $R^{11}$ represents an alkylene group having, preferably, 1 to 22 carbon atoms. The above illustrated groups may also be partially or fully hydrogenated. Suitable examples of $R^9$ and $R^{10}$ are a hydrogen atom and a methyl group, and suitable examples of $R^{11}$ are $-CH_2-$ or $-C_4H_8-$. Furthermore, specific examples of the divalent organic groups are organic groups having at least one of —O—,

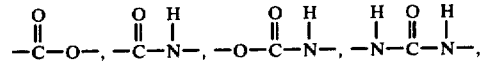

and —S— in the groups. For example, there are

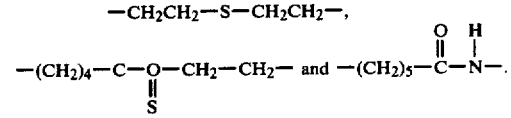

Also, Examples of substituents of these divalent organic groups are $-CH_3$, $CH_3CH_2-$,

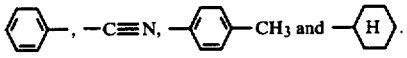

Examples of the trivalent and tetravelent organic groups represented by $R^1$ in general formula (I) are a saturated or unsaturated aliphatic hydrocarbon group, an aromatic hydrocarbon group, an alicyclic hydrocarbon group and a heterocyclic group.

Also, specific examples of the trivalent organic groups and tetravalent organic groups represented by $R^1$ are as follows:

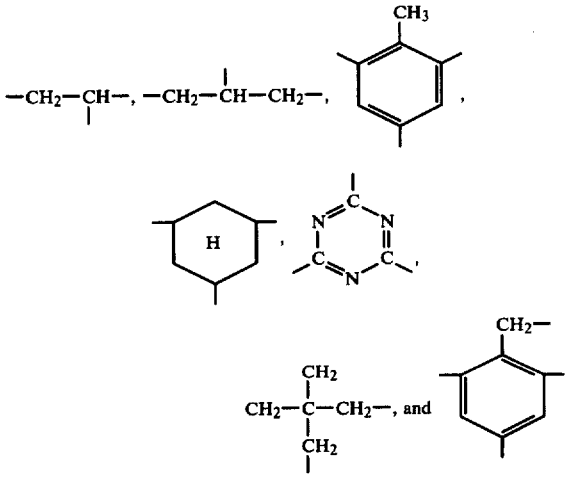

Typical examples of amine compounds represented by the general formula (I) are shown below:

| | Description |
|---|---|
| 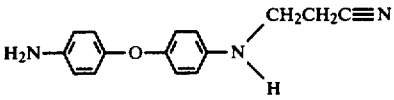 | (Compound Designation) Light Yellow Solid (I-1) |
| 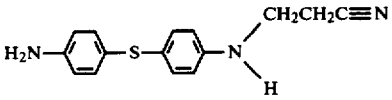 | (Compound Designation) Black-Brown Solid (I-2) |

-continued
| | Description |
|---|---|
| 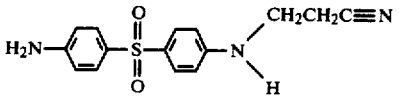 | Black-Brown Solid (I-3) |
| 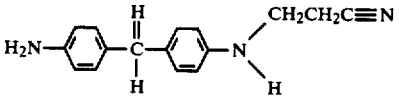 | Light-Yellow Solid (I-4) |
| 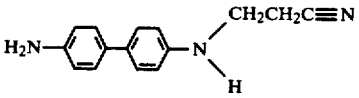 | Light-Yellow Solid (I-5) |
| 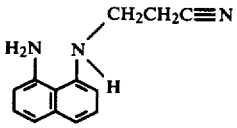 | Light-Yellow Solid (I-6) |
| 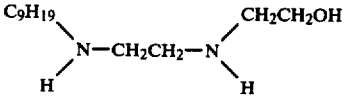 | Yellow Liquid (I-7) |
| 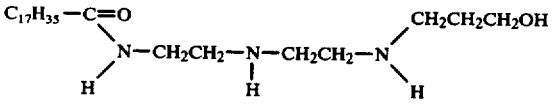 | Yellow Solid (I-8) |
| 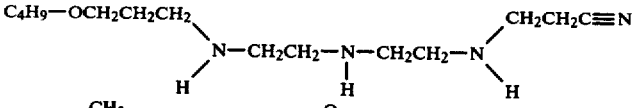 | Yellow Liquid (I-9) |
| 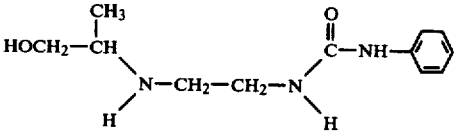 | Colorless Transparent Liquid (I-10) |
| 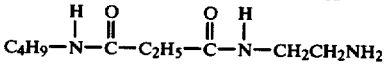 | Yellow Liquid (I-11) |
| 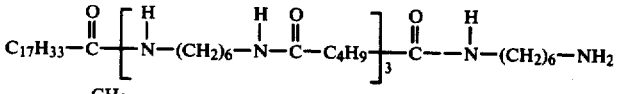 | Yellow Liquid (I-12) |
| 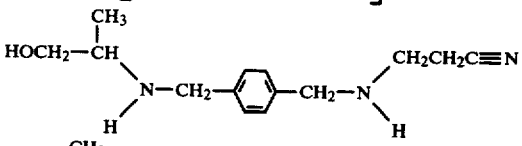 | Light-Yellow Liquid (I-13) |
| 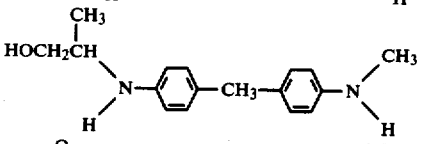 | Light-Yellow Solid (I-14) |
| 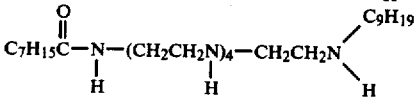 | (Compound Designation) Brown Liquid (I-15) |
| 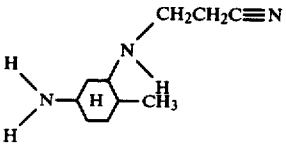 | Brown Liquid (I-16) |
| 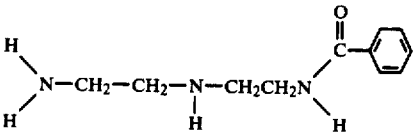 | Yellow Liquid (I-17) |

-continued
| | Description |
|---|---|
| 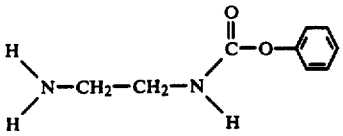 | Yellow Liquid (I-18) |
| 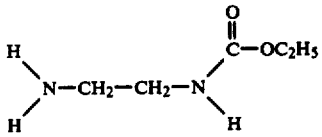 | Yellow Liquid (I-19) |
| 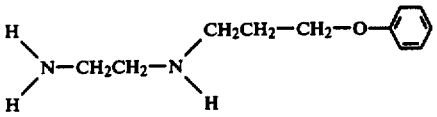 | Yellow Liquid (I-20) |
| 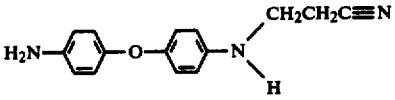 | White Solid (I-21) |
| 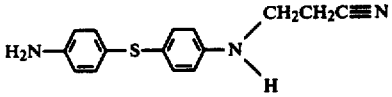 | Light-Yellow Solid (I-22) |
| 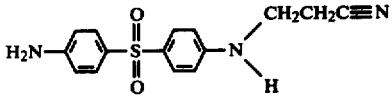 | Black Brown Solid (I-23) |
| 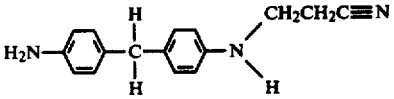 | Light-Yellow Solid (I-24) |
| 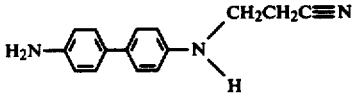 | Light-Yellow Solid (I-25) |
| 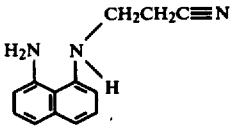 | Light-Yellow Solid (I-26) |
| 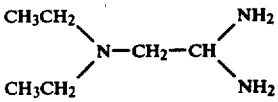 | (Compound Designation) Transparent Liquid (I-27) |
| 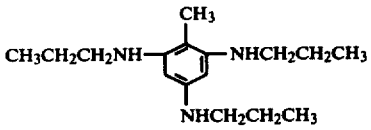 | White Solid (I-28) |
| 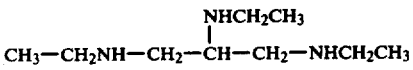 | White Solid (I-29) |
| 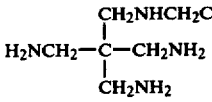 | White Solid (I-30) |
| 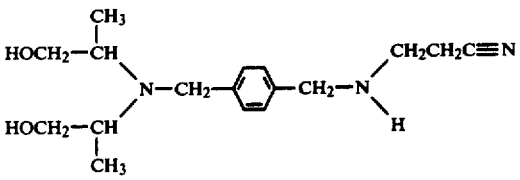 | Light-Yellow Liquid (I-31) |

-continued
| | Description |
|---|---|
| 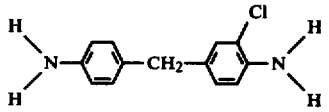 | Brown Solid (I-32) |
| 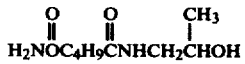 | Light-Yellow Liquid (I-33) |
| 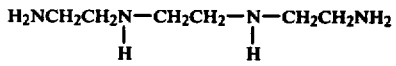 | Brown Liquid (I-34) |
| 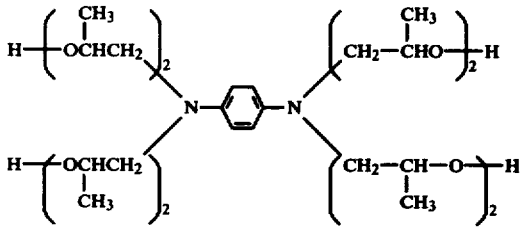 | Colorless Transparent Liquid (I-35) |
| 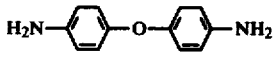 | Light-Yellow Solid (I-36) |
| 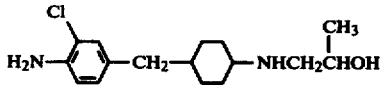 | Brown Solid (I-37) |
| 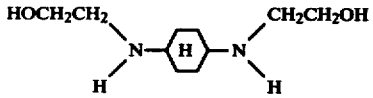 | Light-Yellow Solid (I-38) |
| 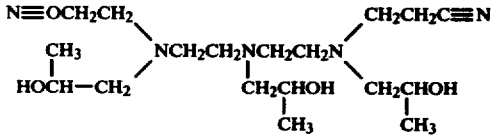 | Colorless Transparent Liquid (I-39) |
| 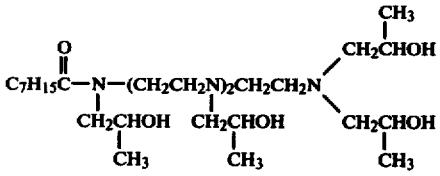 | (Compound Designation) Yellow Brown Liquid (I-40) |
| 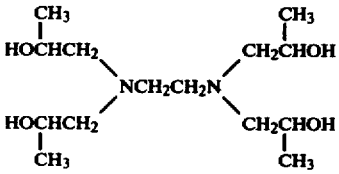 | Colorless Transparent Liquid (I-41) |
| 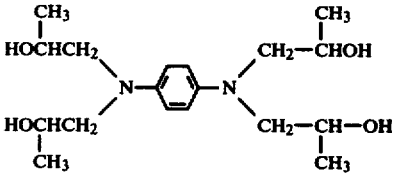 | Colorless Transparent Liquid (I-42) |
| 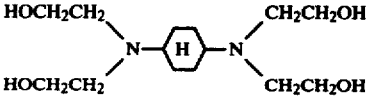 | Colorless Transparent Liquid (I-43) |

-continued
| | Description |
|---|---|
| 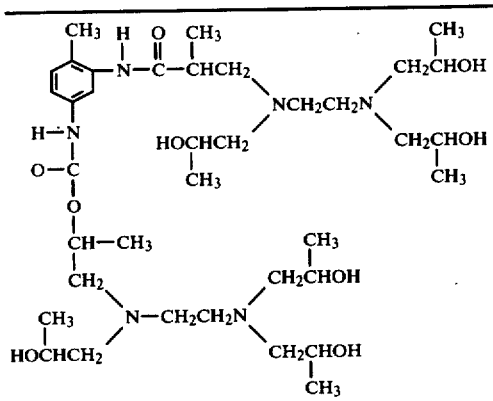 | Colorless Transparent Highly Viscous Liquid (I-41-A) |
|  | Colorless Transparent Liquid (I-44) |
| 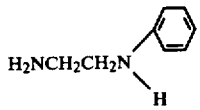 | White Solid (I-45) |
| 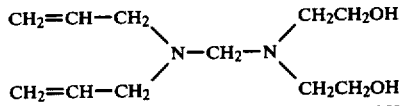 | Yellow Solid (I-46) |
| 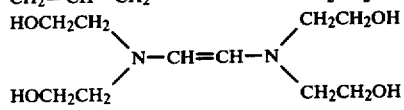 | Yellow Solid (I-47) |
| 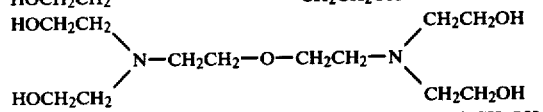 | Yellow Solid (I-48) |
| 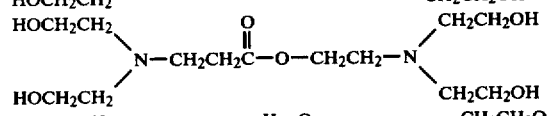 | (Compound Designation) Yellow Solid (I-49) |
| 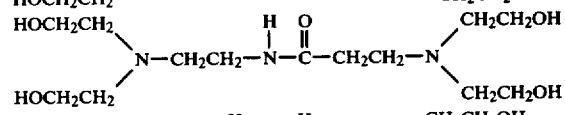 | Yellow Solid (I-50) |
| 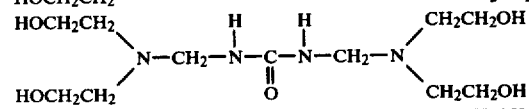 | Yellow Solid (I-51) |
| 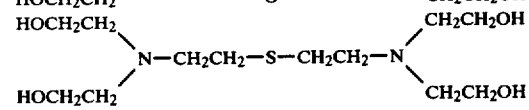 | Yellow Liquid (I-52) |
| 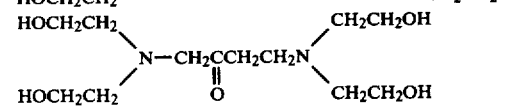 | Yellow Solid (I-53) |
| 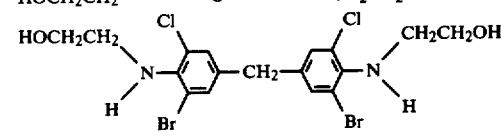 | Yellow Solid (I-54) |
| 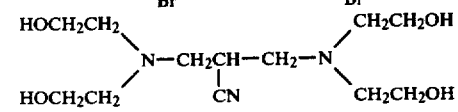 | Yellow Solid (I-55) |
| 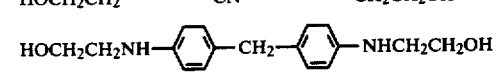 | Yellow Solid (I-56) |

-continued

| | Description |
|---|---|
| $HOCH(CH_3)CH_2O-C_6H_4-OCH_2CH(CH_3)OH$ | Light Yellow Solid (I-57) |
| $C_4H_9N(H)-C(=O)-C_4H_9-C(=O)-NH_2$ | Light Yellow Liquid (I-58) |

In the amine compounds represented by the general formula (II), examples of the divalent organic groups represented by $R^3$, $R^4$ and $R^5$ are a saturated or unsaturated alkylene group, an arylene group, or a divalent alicyclic group. In this case, the alkylene group has about 1 to 22 carbon atoms and the number of carbons forming the ring of the alicyclic group is about 3 to 6. Furthermore, specific examples of these organic group are divalent organic groups containing

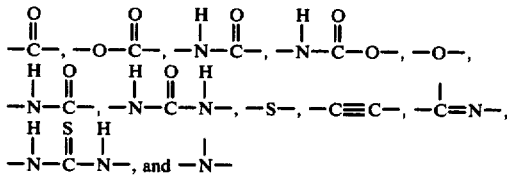

groupings in the groups. Examples of monovalent organic groups represented by $A^6$, $A^7$, and $A^8$ are the same as the monovalent organic group represented by $A^1$ to $A^5$ and described for the general formula (I).

Typical examples of amine compounds represented by the general formula (II) are shown below:

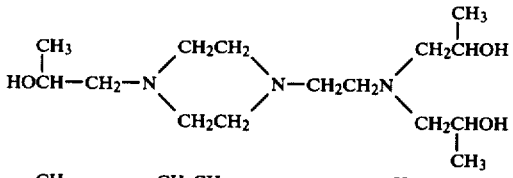

Colorless Transparent Liquid (II-1)

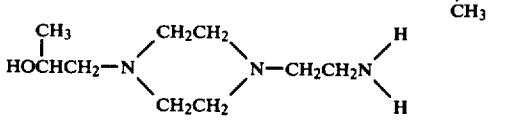

Colorless Transparent Liquid (II-2)

In the amine compounds represented by general formula (III), the monovalent organic groups represented by $A^9$, $A^{10}$, $A^{11}$ and $A^{12}$ are the same as the monovalent organic groups represented by $A^1$ to $A^5$ and described for general formula (I).

Typical examples of compounds represented by general formula (III) are shown below:

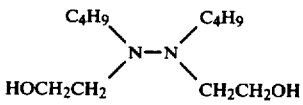

Light Yellow Liquid (III-1)

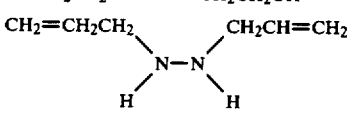

Light Yellow Liquid (III-2)

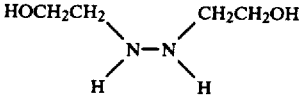

Colorless Liquid (III-3)

-continued

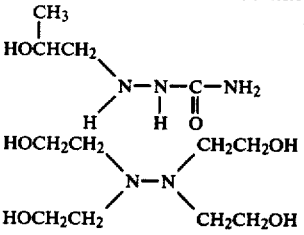

Colorless Transparent Liquid (III-4)

Colorless Transparent Liquid (III-5)

In the amine compounds represented by the general formula (IV), the monovalent organic groups represented by $A^{13}$ and $A^{14}$ are the same as the monovalent organic groups represented by $A^1$ to $A^5$ and described for the general formula (I).

Examples of the divalent organic groups represented by $R^6$ and $R^7$ in the general formula (IV) are a saturated or unsaturated alkylene group, an arylene group, or a divalent alicyclic group. In this case, the alkylene group has about 1 to 22 carbon atoms and the number of carbons forming the ring of the alicyclic group is about 3 to 6. Furthermore, specific examples of these organic groups are divalent organic groups containing

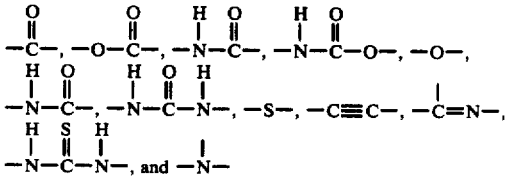

groupings in the groups.

Typical examples of compounds represented by general formula (IV) are shown below:

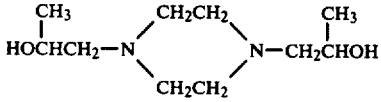

Colorless Transparent Liquid (IV-1)

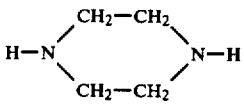

Colorless Transparent Liquid (IV-3)

-continued

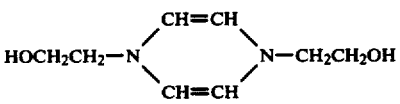

Yellow Solid (IV-2)

In the amine compounds represented by general formula (V), the monovalent organic groups shown by $A^{15}$ to $A^{19}$ are the same as the monovalent organic groups represented by $A^1$ to $A^5$ and described for general formula (I). Typical examples of compounds represented by general formula (V) are shown below:

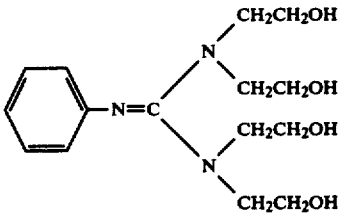

Yellow Solid (V-1)

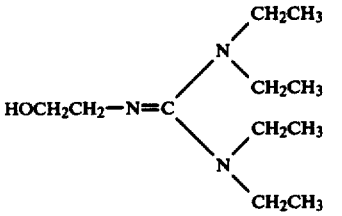

Yellow Solid (V-2)

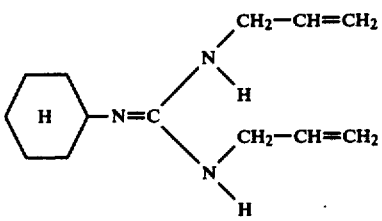

Brown Solid (V-3)

Examples of monovalent organic groups represented by $A^{20}$ to $A^{22}$ in the general formula (VI) are the same as the monovalent organic groups represented by $A^1$ to $A^5$ and described for the formula (I).

Typical examples of amine compounds represented by the general formula (VI) are shown below:

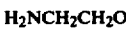

Colorless Transparent Liquid (VI-1)

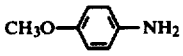

White Solid (VI-2)

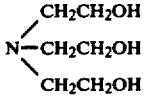

Colorless Transparent Liquid (VI-3)

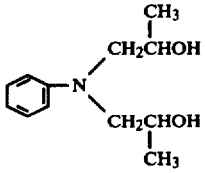

Colorless Transparent Liquid (VI-4)

-continued

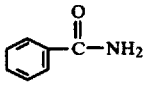

White Solid (VI-5)

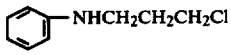

White Solid (VI-6)

Examples of monovalent organic groups represented by $A^{23}$ and $A^{24}$ in the general formula (VII) are the same as the monovalent organic groups represented by $A^1$ to $A^5$ and described for the formula (I). Examples of organic groups represented by $R^8$ in the general formula (VII) are a monovalent, divalent, or trivalent saturated or unsaturated aliphatic hydrocarbon group, an aromatic hydrocarbon group, an alicyclic group, hydroxyl-substituted groups of these aliphatic, aromatic and alicyclic groups, and the aforesaid groups each substituted by a saturated or unsaturated alkyl group having about 1 to 10 carbon atoms or an aryl group. The number of carbon atoms of the aliphatic hydrocarbon group ranges from about 1 to 22 and the number of carbons forming the ring of the alicyclic group ranges from about 3 to 6. Other examples of $R^8$ are

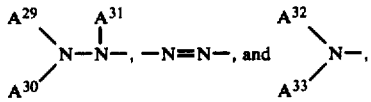

wherein $A^{29}$, $A^{30}$, $A^{31}$, $A^{32}$, and $A^{33}$ each represents the same monovalent organic groups, represented by $A^1$ to $A^5$ and described for the formula (I) or a hydrogen atom. In the amine compounds of the general formula (VII), it is essential at least one of $R^8$, $A^{23}$, and $A^{24}$ be a hydrogen atom or a group having a hydrogen atom active to an isocyanate group and examples of groups having an active hydrogen atom are a hydroxy-substituted alkyl group and an alkyl group substituted with an —SH group.

Typical examples of compounds represented by general formula (VII) are shown below:

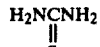

White Solid (VII-1)

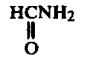

Colorless Transparent Liquid (VII-2)

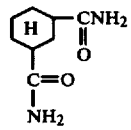

White Solid (VII-3)

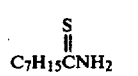

Yellow Solid (VII-7)

Colorless Transparent Liquid (VII-4)

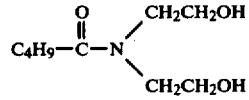

White Solid (VII-5)

Even in the case of using the above-described amine compound individually, quite excellent flame-resisting effects can be obtained without the necessity of using a phosphorus-containing compound when a polyetherpolyol having a polyoxyethylene chain or polyesterpolyol prepared by using a polyglycol-containing ethylene glycol is used as the foaming material together with the amine compound.

As described above, by blending the amine compound represented by general formula (I), (II), (III), (IV), (V), (VI) or (VII), individually in the production of polyurethane foam, it is possible to render the polyurethane foam flame resistant, but more excellent flame-resisting effects can be obtained by using a combination of two kinds of any amine compounds. A combination of an amine compound wherein at least one member of the monovalent groups $A^1$ to $A^{24}$ is a hydrogen atom and an amine compound wherein all the monovalent organic groups $A^1$ to $A^{24}$ are hydroxyl-containing groups or those having hydroxyl-containing groups and organic groups having no active hydrogen atom is especially preferred.

The polyurethane foam obtained using the aforesaid amine compounds without using a flame retarder is self-extinguishing with a burning distance of 14 to 22 mm as tested in accordance with ASTM D 1692-68. When two kinds of amine compounds selected from the two groups described above were used without adding a flame retarder, the polyurethane foams thus prepared show self-extinguishing properties with a burning distance of 0 to 4 mm using the ASTM D 1692-68 test.

In the present invention, a flame retarder can be used in combination with the aforesaid amine compound or compounds although as is apparent from the above set forth results, the flame-resisting effects can be obtained without using such flame retarder. Suitable flame retarders which can be used in this invention in such a case are phosphorus-containing compounds. Examples of these phosphorus-containing compounds are those compounds containing phosphorus only and which do not contain any halogen such as, for example, triphenyl phosphate, tricresyl phosphate, diethyl-N,N-bis(2-hydroxyethyl)aminomethyl phosphonate. Vercol 82 (trade name, the structure of which is believed to be

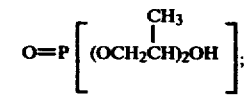

produced by Mobil Oil Co.), ammonium polyphosphate, bis(dipropylene glycol)dipropylene glycol phosphonate, tri(dipropylene glycol)phosphite, heptaquisdipropylene glycol triphosphite, trimethyl phosphate, triethyl phosphate, tributyl phosphate and trioctyl phosphate.

Compounds containing phosphorus and halogen can be also used as the flame retarder where desired and examples of such compounds are tri-2,3-dibromopropyl phosphate, trischloroethyl phosphate, trisdichloropropyl phosphate. Phosgard 2XC-20 (trade name of Monsanto Chemical Co., for a product having the formula

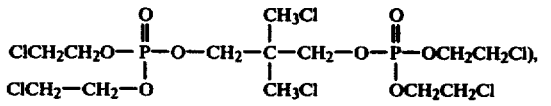

and monodichloropropylbis(dibromopropyl)phosphate.

Compounds containing phosphorus and halogen provide superior flame-resisting effects to the effects obtained with a compound containing phosphorus only and this is believed to be based on the synergistic effect of the phosphorus and halogen. The above-described compounds can be used individually or in combination. Furthermore, if desired, the aforesaid phosphorus-containing compound can be used together with an organo halogen compound such as tetrabromophthalic anhydride, tetrabromobisphenol A, tetrabromobutane, hexabromobenzene, dichloropropanol, and dibromopropanol.

The amount of the phosphorus-containing compound used in this invention can be much smaller than the amount employed using conventional technique and can be less than about 0.5% by weight to the weight of polyurethane foam.

The polyetherpolyol or the polyesterpolyol used in this invention can be free by selected to achieve the desired polyurethane foam. That is, as the polyetherpolyol or polyesterpolyol for rigid polyurethane foam, polyols having a hydroxyl value of about 150 to 900 mg KOH/g can be used individually or as a mixture thereof.

The polyetherpolyol used in this invention can be prepared by the addition polymerization reaction of an organic compound having at least two active hydrogen atoms and an alkylene oxide.

Examples of organic compounds having at least two hydrogen atoms which can be used as the raw material for producing the polyetherpolyol suitable for this invention are an alkylene glycol such as ethylene glycol, diethylene glycol, triethylene glycol, propylene glycol, dipropylene glycol, tripropylene glycol, butane-2,3-diol, butane-1,3-diol, hexane-2,5-diol, octadecanediol, octadecenediol, cyclohexane-1,4-dimethanol, glycerine, trimethylolethane, trimethylolpropane, pentaerythritol, mannitol, sorbitol, and sucrose.

Also, suitable examples of alkylene oxides which can be used for the addition polymerization reaction are ethylene oxide, propylene oxide, butylene oxide, epichlorohydrin, and the like.

It is possible in this invention to use the polyetherpolyol prepared by addition polymerizing the alkylene oxide and a mixture of two or more of the abovedescribed raw materials having at least two active hydrogen atoms and further it is also possible to use the polyetherpolyol prepared by random- or block-copolymerizing two or more alkylene oxides.

Moreover, the polyesterpolyol used in this invention can be prepared by the polymerization reaction of a polyol having at least two active hydroxyl groups and a polybasic acid.

Examples of the polyols are, as in the case of polyetherpolyols, an alkylene glycol such as ethylene glycol, diethylene glycol, triethylene glycol, propylene glycol, dipropylene glycol, tripropylene glycol, butane-2,3-diol, butane-1,3-diol, hexane-2,5-diol, octadecanediol, octadecenediol, cyclohexane-1,4-dimethanol, glycerine, trimethylolethane, trimethylolpropane, pentaerythritol, mannitol, sorbitol, sucrose, etc.

Examples of suitable polybasic acids are adipic acid, succinic acid, suberic acid, sebacic acid, oxalic acid, methyladipic acid, glutaric acid, pimelic acid, azelaic acid, phthalic acid, terephthalic acid, isophthalic acid, 1,2,4-benzenetricarboxylic acid, thiodiglycolic acid, thiodipropionic acid, maleic acid, fumaric acid, citraconic acid, itaconic acid, trimellitic acid, a dimerized or trimerized fatty acid, tartaric acid, etc.

Depending on the kind of polyurethane foam to be produced, higher flame-resisting effects can be obtained as the case may be when the polyetherpolyol or the polyesterpolyol contains oxyethylene groups. In this case, such a purpose can be easily attained by using ethylene oxide or ethylene glycol as a part of the raw material for the production of the polyetherpolyol or the polyesterpolyol.

The polyisocyanate used in the present invention is a material conventionally used for producing polyurethane foams in the art and can be appropriately represented by the general formula $$R^{26}(NCO)_{n3}$$

wherein $R^{26}$ represents an aliphatic group, an aromatic group, a substituted aliphatic group, or a substituted aromatic group and $n_3$ has a mean value of 1.5 to 3.0. Examples of the group $R^{26}$ are

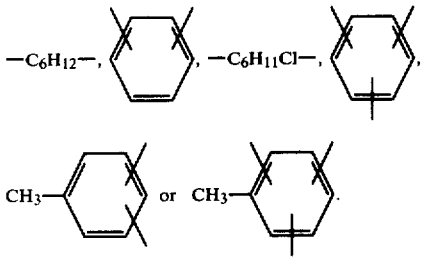

Typical examples of the above-described polyisocyanate are ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate, 2,2-diphenylpropane-4,4'-diisocyanate, p-phenylene diisocyanate, m-phenylene diisocyanate, xylene diisocyanate, 1,4-naphthylene diisocyanate, xylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, furfurylidene diisocyanate, 1-chlorobenzene-2,4-diisocyanate, triisopropenylbenzene diisocyanate, p-isocyanatophenylthiophosphoric acid triester, p-isocyanatophenylphosphoric acid triester, 1-(isocyanatophenyl)ethylisocyanate, 4,4',4''-triisocyanatotriphenylmethane, 1,3,5-triisocyanatobenzene, 2,4,6-triisocyanatotriene, 4,4'-dimethyldiphenylmethane-2,2',5,5'-tetraisocyanate, and the like. They may be used individually or as a mixture thereof.

Of the above-described polyisocyanates, the most widely used polyisocyanates are tolylene diisocyanate, crude polymethylenepolyphenylene isocyanate, crude tolylene diisocyanate, etc., and mixtures thereof.

The above isocyanate or a mixture of isocyanates can be used in an amount of from 0.5 to 3 equivalents, preferably from 1.0 to 2.0 equivalents, per 1 equivalent of the polyetherpolyol and/or polyesterpolyol.

If necessary, catalysts can be used in this invention. Examples of catalysts are amine catalysts such as triethylamine, triethylenediamine, tetramethylethylenediamine, dimethylethanolamine, and the like and metal carboxylates as stannous octoate, dibutyltin dilaurate, lead octylate, and the like. That is, any catalysts which have been used conventionally for the production of polyurethane foams can be used in this invention.

A suitable amount of the catalyst is less than about 5% by weight, preferably 2 to 3% by weight, of the polyetherpolyol and/or polyesterpolyol. The lesser the amount of the catalyst, the better the results can be obtained.

Any foaming agents conventionally employed as the foaming agents for polyurethane foams can be used in this invention. These foaming agents are well-known and a few specific examples of these agents are monofluorotrichloromethane, methylene chloride, water, etc. The amount of the foaming agent is suitably less than about 5% by weight, preferably less than 2% by weight, based on the total weight of the starting materials when water is employed as the foaming agent, and is less than about 70% by weight, preferably 10 to 60% by weight, when a volatile foaming agent is employed.

As an emulsifying agent, a silicone oil such as F-220, F-230, F-260, F-305 and F-307 (trademark of silicone oil, made by Shinetsu Chemical Industry Co.); L-520, L-5340 and L-5420 (trademark of silicone oil, made by Union Carbide Corp.); DC-190, DC-192, DC-193 and DC-195 (trademark of silicone oil, made by Dow Corning Co.); etc., can be used. Such an emulsifying agent can be used in an amount less than about 2%, preferably less than 1.2% by weight based on the total weight of the starting materials for the polyurethane foams.

Various methods of preparing polyurethane foams are described in Japanese Patent Pub. Nos. 7541/'56; 4241/'56; 5742/'57; 7094/'58; 9275/'59; 17498/'60; 8195/'61; 7895/'62; 6000/'63; 2097/'64; 12639/'66; 10630/'67; 19039/'68; 21318/'68; 40075/'70; etc., and according to the most practical method of those known methods, a polyetherpolyol (and/or a polyesterpolyol), polyisocyanate, a forming agent, an amine compound, and other additives, for example, dyes, pigments, fillers, antioxidants, plasticizers and the like are uniformly blended in a short period of time followed by foaming and molding and then the foamed product is heated externally or is allowed to stand to complete the curing of the product. Also, a similar method to that above in which, however, the polyetherpolyol and the polyisocyanate have been partially or completely reacted with each other prior to the blending is useful and has been widely employed. The polyurethane foam can be prepared according to any of the above-described methods of can be prepared using other methods to achieve the objects of this invention.

Now, the invention will be described further by reference to following examples. Unless otherwise indicated, all parts, percents, ratios and the like are by weight.

To confirm the effects and advanages of this invention, Compounds I-1 to VII-5, described hereinbefore were prepared and furthermore for the purpose of comparison the compounds shown by the following formulae were also prepared.

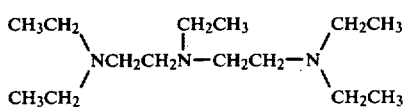

Colorless Transparent Liquid (Y-1)

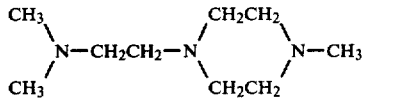

Colorless Transparent Liquid (Y-2)

-continued

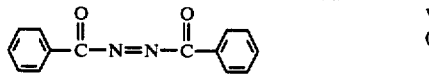

White Powder (Y-3)

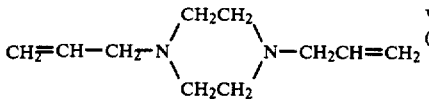

White Solid (Y-4)

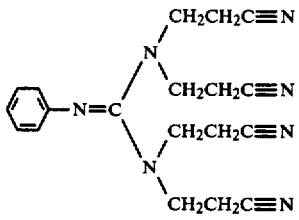

White Solid (Y-5)

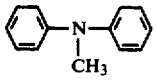

White Solid (Y-6)

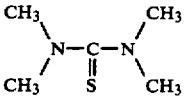

White Solid (Y-7)

It will readily be understood that the above-described compounds prepared for the purposes of comparison are different from and outside the scope of the amine compounds of this invention since each of Compounds Y-1, Y-2, Y-3, Y-4, Y-5, Y-6, and Y-7 has none of hydrogen atom or organic group having a hydrogen atom active to an isocyanate group directly connected to the nitrogen atom although these compound may be considered similar to compounds of general formulae (I) to (VII) in this invention.

The polyetherpolyols for rigid polyurethane foams as shown in Table 1 were prepared by addition-polymerizing propylene oxide to the starting materials shown in the same table. The polyesterpolyol for rigid polyurethane foams as shown in Table 1 was prepared by condensation reaction of glycerine, adipic acid and ethylene glycol.

TABLE 1

| Polyol | Starting Material | Hydroxyl Value | Viscosity | Type |
|---|---|---|---|---|
| | | (mgKOH/g) | (CPS/25° C. | |
| K-1 | Sucrose | 450 | 7000 | Polyetherpolyol |
| K-2 | Sorbitol | 450 | 12000 | " |
| K-3 | Sucrose | 500 | 33000 | " |
| K-4 | Pentacrythritol | 500 | 3500 | " |
| K-5 | Glycerine | 500 | 152000 | Polyesterpolyol |

Also, the phosphorus-containing compounds as shown in Table 2 were prepared as flame retarders.

TABLE 2

| Phosphorus-Containing Compound No. | Chemical Name or Trade Name | Phosphorus Content in the Compound (%) |
|---|---|---|
| P-1 | Trischloroethyl Phosphate | 10.8 |
| P-2 | tris-2,3-Dibromopropyl phosphate | 4.4 |
| P-3 | Fyrol &* | 12.9 |

*Trade name for diethyl-N,N-bis(2-hydroxyethyl)aminomethyl phosphate, produced by Staufer Chemicals Co.

After preparing the raw materials as described above, rigid polyurethane foams were prepared as shown in the following examples.

EXAMPLE 1

Rigid polyurethane foams were prepared using the amine compounds, the flame retarders, and the polyetherpolyols prepared as previously described. The compositions for forming polyurethane foams, the foaming techniques, and the method of testing the flame resistance employed in this example were as follows:

| Composition | parts by weight |
|---|---|
| Polyetherpolyol(1) | variable |
| Water | 1.0 |
| Freon 11(2) | 35 |
| Silicone Oil DC-193(3) | 10 |
| Phosphorus-Containing Compound(1) | variable |
| Amine Compound(1) | variable |
| Millionate MP(4) | 110 (index)(5) |

Note
(1)As shown in Table 3.
(2)Trade name of monofluorotrichloromethane, produced by Darkin Industry Co.
(3)Trademark of silicone oil, produced by Dow Corning Co.
(4)Crude polymethylene polyphenylene isocyanate produced by Nippon Polyurethane Co.
(5)The term "110 (index)" means that the amount of the isocyanate is larger than the equivalent amount of the hydroxyl group to be reacted with the isocyanate by 10%.

Foaming Procedure

In a two liter polyethylene beaker was placed 1 kg of the polyetherpolyol and then all of the remaining components except for the polyisocyanate were added to the polyetherpolol followed by mixing. Then, the temperature of the mixture was adjusted to 20° C.

Thereafter, the polyisocyanate, the temperature of which had been adjusted to 20° C. was poured into the mixture and then the mixture was mixed for 10 seconds using a mixer at 4000 r.p.m. The product thus obtained was poured into a plasticlined steel box. When the system was allowed to foam freely, foaming was completed in 150 seconds. Thereafter, the foamed product was allowed to stand for 24 hours at room temperature (about 20° C. to 30° C.) and cut into pieces for measuring the various properties thereof. The results showed that all foams prepared had good appearance and were enclosed cellular type elastic foams.

Flame Test

The flame test was conducted according to the methods of American Standard of Testing Method D1692-68 (ASTM D1692-68) and the result was evaluated by the burning distance (mm) in each case. The distance between the first marked line and the second marked line of the sample piece was 100 mm.

Test Results

The relation between the amine compounds and the flame resistance of the foams prepared is shown in Table 3, in which all of the numeral values shown by parts are based 100 parts by weight of the polyetherpolyol or polyesterpolyol.

TABLE 3

| Polyol | | Amine Compound | | Phosphorus-Containing Compound | | Dimethyl-ethanol Amine | Rise Time | Foam Density | Burning Distance (mm) | Compression Strength ($kg/cm^2$) | |
|---|---|---|---|---|---|---|---|---|---|---|---|
| No. | (part) | No. | (part) | No. | (part) | (part) | (sec) | ($kg/cm^3$) | ASTM D 1692-68 | Parallel to Rise Direction | Perpendicular to Rise Direction |
| K-1 | 100 | — | — | P-1 | 15 | 3.0 | 102 | 33.4 | 75 | 1.4 | 0.4 |
| K-1 | 60 | I-56 | 40 | — | — | 0.5 | 92 | 31.6 | 45 | 2.4 | 1.1 |
| K-1 | 60 | I-35 | 40 | — | — | 0.5 | 95 | 32.0 | 40 | 2.5 | 1.3 |
| K-1 | 60 | I-36 | 40 | — | — | 0.5 | 89 | 32.2 | 38 | 2.4 | 1.3 |
| K-1 | 60 | I-37 | 40 | — | — | 0.5 | 93 | 31.8 | 42 | 2.6 | 1.2 |
| K-1 | 60 | I-38 | 40 | — | — | 0.5 | 96 | 31.7 | 36 | 2.5 | 1.4 |
| K-1 | 60 | I-57 | 40 | — | — | 0.5 | 94 | 32.0 | 38 | 2.4 | 1.2 |
| K-1 | 60 | I-42 | 40 | — | — | 0.5 | 90 | 33.1 | 51 | 2.4 | 1.0 |
| K-1 | 60 | I-41-A | 40 | — | — | 0.5 | 91 | 32.6 | 27 | 2.6 | 1.4 |
| K-1 | 60 | I-40 | 40 | — | — | 0.5 | 95 | 34.0 | 33 | 2.7 | 1.3 |
| K-1 | 60 | III-3 | 40 | — | — | 0.5 | 94 | 31.5 | 43 | 2.5 | 1.2 |
| K-1 | 80 | I-56 | 20 | — | — | 0.5 | 150 | 34.0 | 100 | 2.2 | 0.9 |
| K-1 | 90 | I-56 | 10 | — | — | 0.5 | 260 | 34.5 | 100 | 2.1 | 0.8 |
| K-1 | 20 | I-56 | 80 | — | — | 0.5 | 40 | 34.1 | 100 | 2.2 | 0.8 |
| K-3 | 80 | I-35 | 20 | — | — | 2.0 | 96 | 33.4 | 100 | 2.0 | 0.7 |
| K-3 | 70 | I-35 | 30 | — | — | 1.0 | 93 | 32.1 | 68 | 2.4 | 1.2 |
| K-3 | 50 | I-35 | 50 | — | — | 0.3 | 88 | 31.5 | 30 | 2.7 | 1.3 |
| K-3 | 40 | I-35 | 60 | — | — | 0 | 87 | 32.0 | 38 | 2.9 | 1.2 |
| K-3 | 30 | I-35 | 70 | — | — | 0 | 65 | 33.0 | 70 | 2.7 | 1.2 |
| K-2 | 50 | I-37 | 50 | P-3 | 5 | 0.5 | 91 | 31.0 | 0 | 2.4 | 1.3 |
| K-1 | 50 | I-37 | 50 | P-3 | 5 | 0.5 | 95 | 30.5 | 0 | 2.4 | 1.1 |
| K-4 | 50 | I-37 | 50 | — | — | 0.3 | 93 | 31.3 | 40 | 2.3 | 1.0 |
| K-3 | 50 | I-35 | 50 | P-1 | 5 | 0.5 | 94 | 32.0 | 0 | 2.2 | 1.0 |
| K-3 | 50 | I-35 | 50 | P-2 | 5 | 0.5 | 90 | 31.8 | 0 | 2.3 | 1.1 |
| K-1 | 60 | Y-1 | 40 | — | — | 1.0 | 92 | 33.3 | 100 | 1.8 | 0.9 |
| K-1 | 60 | Y-2 | 40 | — | — | 1.0 | 92 | 33.2 | 100 | 1.6 | 0.8 |
| K-1 | 60 | Y-3 | 40 | — | — | 1.0 | 95 | 31.6 | 100 | 1.2 | 0.6 |
| K-1 | 60 | Y-4 | 40 | — | — | 1.0 | 78 | 32.5 | 100 | 1.5 | 0.7 |
| K-1 | 60 | Y-5 | 40 | — | — | 1.0 | 78 | 33.4 | 100 | 1.4 | 0.7 |
| K-1 | 60 | Y-6 | 40 | — | — | 0.5 | 85 | 33.2 | 100 | 1.7 | 0.8 |
| K-1 | 60 | Y-7 | 40 | — | — | 0.5 | 82 | 32.2 | 100 | 1.0 | 0.5 |
| K-5 | 10 | I-56 | 90 | — | — | 0.5 | 75 | 33.2 | 100 | 1.8 | 0.9 |
| K-5 | 20 | I-56 | 80 | — | — | 0.5 | 76 | 34.0 | 100 | 1.6 | 0.8 |
| K-5 | 40 | I-56 | 60 | — | — | 0.5 | 80 | 32.5 | 45 | 2.5 | 1.2 |
| K-5 | 60 | I-56 | 40 | — | — | — | 85 | 33.6 | 36 | 2.8 | 1.5 |
| K-5 | 65 | I-56 | 35 | — | — | 0.5 | 90 | 32.4 | 35 | 2.6 | 1.4 |
| K-5 | 80 | I-56 | 20 | — | — | 1.5 | 90 | 30.8 | 100 | 1.4 | 0.7 |
| K-1 | 60 | II-1 | 40 | — | — | 0.5 | 95 | 31.4 | 44 | 2.4 | 1.2 |
| K-1 | 60 | II-2 | 40 | — | — | 0.5 | 91 | 32.3 | 38 | 2.2 | 1.1 |
| K-1 | 60 | III-1 | 40 | — | — | 0.5 | 86 | 30.1 | 26 | 2.8 | 1.4 |
| K-1 | 60 | III-2 | 40 | — | — | 0.5 | 92 | 32.5 | 35 | 2.4 | 1.4 |
| K-1 | 60 | III-4 | 40 | — | — | 0.5 | 87 | 33.0 | 24 | 2.5 | 1.2 |
| K-1 | 50 | III-5 | 40 | — | — | 0.5 | 87 | 30.8 | 20 | 2.4 | 1.2 |
| K-1 | 50 | IV-1 | 50 | — | — | 0.5 | 78 | 31.6 | 25 | 2.2 | 1.1 |
| K-3 | 40 | IV-2 | 60 | — | — | — | 90 | 31.9 | 24 | 26 | 1.3 |
| K-3 | 40 | V-1 | 60 | — | — | — | 92 | 33.0 | 18 | 2.4 | 1.4 |
| K-3 | 40 | V-2 | 60 | — | — | — | 90 | 32.5 | 21 | 2.3 | 1.2 |
| K-3 | 40 | V-3 | 60 | — | — | — | 88 | 32.4 | 28 | 2.1 | 1.1 |
| K-3 | 40 | VI-1 | 60 | — | — | — | 88 | 31.8 | 34 | 2.1 | 0.9 |
| K-3 | 40 | VI-2 | 60 | — | — | — | 95 | 31.7 | 38 | 2.6 | 1.2 |
| K-3 | 40 | VI-3 | 60 | — | — | — | 80 | 31.5 | 45 | 2.5 | 1.3 |
| K-1 | 40 | VI-4 | 60 | — | — | — | 85 | 32.4 | 44 | 2.3 | 1.2 |
| K-1 | 40 | VI-5 | 60 | — | — | 0.5 | 95 | 32.6 | 42 | 2.4 | 1.2 |
| K-1 | 40 | VI-6 | 60 | — | — | 0.5 | 96 | 32.1 | 46 | 2.3 | 1.2 |
| K-3 | 60 | VII-1 | 40 | — | — | 0.5 | 87 | 32.0 | 43 | 2.5 | 1.4 |
| K-3 | 60 | VII-2 | 40 | — | — | 0.5 | 94 | 30.9 | 42 | 2.2 | 1.2 |
| K-3 | 60 | VII-3 | 40 | — | — | 0.5 | 90 | 32.1 | 38 | 2.3 | 1.3 |
| K-3 | 60 | VII-4 | 40 | — | — | 0.5 | 92 | 32.0 | 39 | 2.3 | 1.2 |

As is apparent from the results shown in Table 3, good flame-resisting effects can be obtained in the cases where the amine compounds of this invention are used, as compared with those obtained by using Reference Compounds (Y-1 to Y-7). In addition, it is apparent that the properties of the resulting foams such as an increase of density, a lowering of compression strength almost do not deteriorate when the amine compounds of this invention are used. Further, the above results suggest that excellent results can be attained when the amine compounds are used in a proportion of 70 to 30 parts by weight relative to 30 to 70 parts by weight of the polyetherpolyols or polyesterpolyols.

EXAMPLE 2

Rigid polyurethane foams were prepared using the amine compounds, the polyetherpolyols, and silicone oils previously described. The compositions of the foaming materials, the foaming procedure, and the flame test employed in this example were as follows:

| Composition | Parts by Weight |
|---|---|
| Polyetherpolyol(1) | variable |
| Freon 11 | variable |
| Silicone Oil L-5420(2) | 1.5 |
| Dabco 33 LV(3) | variable |

-continued

| Composition | Parts by Weight |
|---|---|
| Phosphorus-Containing Compound[1] | variable |
| Amine Compound[1] | variable |
| PAP[4] | (index) |

Note:
[1]As shown in Table 4.
[2]Trademark of silicone oil, produced by Union Carbide Co.
[3]Trademark of triethylenediamine, produced by Houdry Process & Chemicals Co.
[4]Trademark of polyisocyanate, produced by the Upjohn Co.

TABLE 4

| Polyol | | Amine Compound | | Phosphorus-Containing Compound | | Dabco 33LV | Freon 11 | Rise Time | Foam Density | Burning Distance (mm) ASTM D | Compression Strength ($kg/cm^2$) | |
|---|---|---|---|---|---|---|---|---|---|---|---|---|
| No. | (part) | No. | (part) | No. | (part) | (part) | (part) | (sec) | ($kg/m^3$) | 1692-68 | Parallel to Rise Direction | Perpendicular to Rise Direction |
| K-3 | 50 | I-38 | 50 | — | — | — | 10 | 95 | 41.6 | 38 | 30.1 | 25.3 |
| K-3 | 50 | I-38 | 50 | — | — | — | 15 | 98 | 37.2 | 34 | 15.2 | 14.0 |
| K-3 | 50 | I-38 | 50 | — | — | — | 20 | 97 | 32.4 | 36 | 6.7 | 5.1 |
| K-3 | 50 | I-38 | 50 | — | — | — | 25 | 100 | 27.2 | 24 | 4.1 | 2.7 |
| K-3 | 50 | I-38 | 50 | — | — | — | 30 | 102 | 22.5 | 11 | 2.5 | 1.2 |
| K-3 | 50 | Y-1 | 50 | P-1 | 15 | — | 10 | 94 | 42.0 | 37 | 29.4 | 23.0 |
| K-3 | 50 | Y-2 | 50 | P-1 | 15 | — | 15 | 92 | 37.8 | 46 | 14.1 | 12.0 |
| K-3 | 50 | Y-3 | 50 | P-1 | 15 | — | 20 | 88 | 32.2 | 61 | 4.8 | 3.9 |
| K-3 | 50 | Y-4 | 50 | P-1 | 15 | — | 25 | 84 | 27.5 | 85 | 3.0 | 1.5 |
| K-3 | 50 | Y-5 | 50 | P-1 | 15 | — | 30 | 81 | 22.2 | 95 | 1.8 | 0.7 |
| K-3 | 100 | — | — | P-1 | 15 | 1.8 | 10 | 94 | 43.1 | 36 | 28.2 | 22.5 |
| K-3 | 100 | — | — | P-1 | 15 | 1.8 | 15 | 98 | 49.0 | 48 | 14.2 | 12.2 |
| K-3 | 100 | — | — | P-1 | 15 | 1.8 | 20 | 105 | 33.0 | 72 | 3.9 | 2.8 |
| K-3 | 100 | — | — | P-1 | 15 | 1.8 | 25 | 111 | 28.5 | 100 | 3.0 | 1.5 |
| K-3 | 100 | — | — | P-1 | 15 | 1.8 | 30 | 120 | 24.2 | 100 | 1.7 | 0.6 |
| K-1 | 65 | I-41-A | 35 | P-2 | 2 | 0.8 | 25 | 92 | 27.2 | 14 | 4.0 | 2.7 |
| K-1 | 65 | I-41-A | 35 | P-2 | 4 | 0.8 | 25 | 95 | 26.9 | 2 | 4.1 | 2.7 |
| K-1 | 65 | I-41-A | 35 | P-2 | 6 | 0.8 | 25 | 93 | 27.3 | 0 | 3.8 | 2.9 |
| K-1 | 65 | I-41-A | 35 | P-2 | 8 | 0.8 | 25 | 89 | 27.8 | 0 | 4.0 | 2.7 |
| K-1 | 65 | Y-2 | 35 | P-2 | 2 | 0.8 | 25 | 94 | 27.5 | 100 | 3.5 | 2.0 |
| K-1 | 65 | Y-2 | 35 | P-2 | 4 | 0.8 | 25 | 93 | 28.0 | 100 | 3.8 | 1.8 |
| K-1 | 65 | Y-2 | 35 | P-2 | 6 | 0.8 | 25 | 88 | 28.2 | 100 | 3.3 | 1.8 |
| K-1 | 65 | Y-2 | 35 | P-2 | 8 | 0.8 | 25 | 93 | 27.9 | 96 | 3.6 | 1.9 |

Foaming Procedure

Same as in Example 1.

Flame Test

Same as in Example 1.

Flame Test Results

The test results obtained are shown in TAble 4. As shown in the table, the amine compounds of this invention make it possible to provide a good flame-resisting property to the polyurethane foam without causing any deterioration of physical properties of the foam.

EXAMPLE 3

Rigid polyurethane foams were prepared using the combination of two kinds of the amine compounds and the polyetherpolyols previously described. The composition of the foaming mixtures, the foaming procedures, and the flame resistance test employed in this example were as follows:

| Composition | parts by weight |
|---|---|
| Polyetherpolyol[1] | variable |
| Water | 1.0 |
| Freon II | 35 |
| Silicone Oil DC-195[2] | 1.0 |
| Dimethylethanolamine | 1.5 |
| Amine Compound[1] | variable |
| Millionate MR | 105 (index) |

Note:
[1]As shown in Table 5.
[2]Trademark of silicone oil, produced by Dow Corning Co.

Foaming Procedure and Burning Test

Same as in Example 1.

Flame Test Result

The results obtained are shown in Table 5. That is, as shown in Table 5, the polyurethane foams prepared showed sufficient flame-resisting effect in the case of using the combination of two kinds of the amine compounds of this invention without using a phosphorus-containing compound.

TABLE 5

| Experiments | Polyetherpolyol | | Amine Compound [I] | | Amine Compound [II] | | Foam Density | ASTM Burning Distance |
|---|---|---|---|---|---|---|---|---|
| No. | No. | Part | No. | Part | No. | Part | ($kg/m^3$) | (mm) |
| I-1 | K-1 | 60 | I-4 | 5 | I-35 | 35 | 32.5 | 10 |
| I-2 | K-1 | 60 | I-6 | 5 | I-39 | 35 | 31.5 | 8 |
| I-3 | K-1 | 60 | II-2 | 5 | I-42 | 35 | 32.4 | 12 |
| I-4 | K-1 | 60 | III-3 | 5 | I-46 | 35 | 31.8 | 6 |
| I-5 | K-1 | 60 | IV-3 | 5 | I-49 | 35 | 31.8 | 0 |
| I-6 | K-1 | 60 | V-3 | 10 | I-55 | 30 | 32.0 | 12 |
| I-7 | K-1 | 60 | VI-1 | 10 | I-52 | 30 | 32.2 | 9 |
| I-8 | K-1 | 60 | VI-4 | 10 | I-40 | 30 | 31.6 | 7 |
| I-9 | K-1 | 60 | II-2 | 10 | I-35 | 30 | 32.3 | 6 |
| I-10 | K-1 | 60 | II-2 | 10 | II-1 | 30 | 32.6 | 2 |
| I-11 | K-2 | 40 | I-2 | 20 | III-5 | 40 | 31.5 | 18 |
| I-12 | K-2 | 40 | II-2 | 20 | VI-2 | 40 | 31.4 | 21 |
| I-13 | K-2 | 40 | II-2 | 20 | V-2 | 40 | 31.6 | 16 |

TABLE 5-continued

| Experiments | Polyetherpolyol | | Amine Compound [I] | | Amine Compound [II] | | Foam Density | ASTM Burning Distance |
|---|---|---|---|---|---|---|---|---|
| No. | No. | Part | No. | Part | No. | Part | (kg/m³) | (mm) |
| 1-14 | K-2 | 40 | II-2 | 20 | VI-3 | 40 | 32.0 | 18 |
| 1-15 | K-2 | 40 | II-2 | 20 | VI-5 | 40 | 32.2 | 14 |
| 1-16 | K-3 | 35 | III-2 | 2.5 | I-47 | 62.5 | 31.5 | 2 |
| 1-17 | K-3 | 35 | III-3 | 2.5 | II-1 | 62.5 | 31.7 | 4 |
| 1-18 | K-3 | 35 | II-4 | 2.5 | III-5 | 62.5 | 32.6 | 2 |
| 1-19 | K-3 | 50 | III-2 | 2.5 | IV-1 | 47.5 | 31.3 | 6 |
| 1-20 | K-3 | 50 | III-3 | 2.5 | V-1 | 47.5 | 33.0 | 5 |
| 1-21 | K-4 | 65 | III-4 | 5 | VI-4 | 30 | 31.3 | 22 |
| 1-22 | K-4 | 65 | IV-2 | 10 | VI-5 | 25 | 31.2 | 24 |
| 1-23 | K-4 | 65 | IV-3 | 15 | I-43 | 20 | 32.6 | 22 |
| 1-24 | K-1 | 100 | — | — | — | — | 32.1 | 100 |

EXAMPLE 4

Rigid polyurethane foams were prepared using the polyetherpolyols, the silicone oils, and the combination of two kinds of the amine compounds, and the phosphorus-containing compounds as previously described. The compositions of the foaming mixtures, the foaming procedure, and the flame test results were as follows:

| Composition | parts by weight |
|---|---|
| Polyetherpolyol(1) | variable |
| Freon 11 | 45 |
| Silicone Oil L5340 | 1.2 |
| Dimethylethanolamine | 1.5 |
| Phosphorus-Containing Compound(1) | variable |
| Amine Compound(1) | variable |
| polyisocyanate(2) | 105 (index) |

Note:
(1)As shown in Table 6.
(2)A prepolymer of TDI-80 (trademark of tolylene diisocyanate, produced by Nippon Soda Co., Ltd.) and a polyetherpolyol; isocyanate group content, 30%.

Foaming procedure and flame test procedure were the same as in Example 1.

Flame Test Result

The results obtained are shown in Table 6.

TABLE 6

| Experiments | Polyetherpolyol | | Amine Compound [I] | | Amine Compound [II] | | Flame Retardant | | Foam Density | ASTM Burning Distance |
|---|---|---|---|---|---|---|---|---|---|---|
| No. | No. | Part | No. | Part | No. | Part | No. | Part | (kg/m³) | (mm) |
| 2-1 | K-1 | 60 | I-7 | 5 | Y-1 | 35 | — | — | 22.6 | 100 |
| 2-2 | K-1 | 60 | I-8 | 5 | Y-2 | 35 | — | — | 23.1 | 100 |
| 2-3 | K-1 | 60 | I-9 | 5 | Y-3 | 35 | — | — | 21.5 | 100 |
| 2-4 | K-1 | 60 | I-10 | 5 | Y-4 | 35 | — | — | 22.0 | 100 |
| 2-5 | K-1 | 60 | I-11 | 5 | Y-5 | 35 | — | — | 24.0 | 100 |
| 2-6 | K-1 | 60 | I-13 | 3 | Y-6 | 37 | — | — | 22.4 | 100 |
| 2-7 | K-1 | 60 | I-14 | 3 | Y-7 | 37 | P-1 | 2 | 22.5 | 100 |
| 2-8 | K-1 | 60 | I-15 | 3 | I-46 | 37 | P-1 | 4 | 22.6 | 2 |
| 2-9 | K-1 | 60 | I-16 | 3 | I-47 | 37 | P-1 | 6 | 22.8 | 0 |
| 2-10 | K-1 | 60 | I-17 | 3 | I-48 | 37 | P-1 | 8 | 22.8 | 0 |
| 2-11 | K-3 | 40 | I-18 | 10 | I-49 | 50 | P-2 | 10 | 22.6 | 0 |
| 2-12 | K-3 | 40 | II-2 | 5 | I-52 | 55 | — | — | 21.2 | 10 |
| 2-13 | K-3 | 40 | III-2 | 5 | I-53 | 55 | P-3 | 2 | 21.5 | 6 |
| 2-14 | K-3 | 40 | IV-3 | 5 | II-1 | 55 | P-3 | 4 | 21.7 | 0 |
| 2-15 | K-3 | 40 | V-3 | 5 | III-5 | 55 | P-3 | 6 | 21.7 | 0 |
| 2-16 | K-3 | 40 | VI-1 | 5 | IV-2 | 55 | P-3 | 8 | 22.0 | 0 |
| 2-17 | K-1 | 20 | VII-3 | 2 | V-1 | 78 | — | — | 21.3 | 100 |
| 2-18 | K-1 | 20 | VI-4 | 2 | V-3 | 78 | — | — | 21.6 | 100 |
| 2-19 | K-1 | 100 | — | — | — | — | P-1 | 6 | 21.8 | 100 |
| 2-20 | K-1 | 100 | — | — | — | — | P-1 | 8 | 22.0 | 83 |
| 2-21 | K-1 | 100 | — | — | — | — | P-1 | 12 | 22.8 | 36 |
| 2-22 | K-1 | 100 | — | — | — | — | P-1 | 14 | 23.2 | 24 |
| 2-23 | K-1 | 100 | — | — | — | — | P-1 | 16 | 23.5 | 4 |

As shown in Table 6, when the combination of two kinds of amine compounds of this invention was used together with phosphorus-containing compound more excellent flame-resisting effects were obtained as compared with the cases of using the amine compound individually and a combination of the two kinds of amine compounds without phosphorus-containing compound.

Results of Foaming

The physical properties of the foam are shown in Table 7.

TABLE 7

| | Experiment No. | | 3-1 | 3-2 | 3-3 | 3-4 | 3-5 |
|---|---|---|---|---|---|---|---|
| | Polyetherpolyol K-1 | 60 | 60 | 60 | 100 | 70 | |
| Amine | I-8 | | 10 | | | | |
| Compound | I-10 | | | 10 | | | 30 |
| [I] | VI-6 | | | | 10 | | |
| Amine | I-42 | | 30 | | | | |

TABLE 7-continued

| | Experiment No. | | 3-1 | 3-2 | 3-3 | 3-4 | 3-5 |
|---|---|---|---|---|---|---|---|
| | Polyetherpolyol K-1 | | 60 | 60 | 100 | 70 | |
| Compound [II] | II-2 | | | 30 | | | |
| | I-39 | | | | 30 | | |
| | Rise Time (sec) | | 54 | 60 | 58 | 90 | 65 |
| | Density (kg/m$^3$) | | 22.0 | 23.2 | 22.5 | 24.0 | 24.3 |
| | 10% Compression Strength | * | 2.6 | 2.8 | 2.4 | 1.6 | 1.7 |
| | (Kg/cm$^2$) | ** | 1.3 | 1.4 | 1.2 | 0.7 | 0.7 |
| Foam Properties | Dimension Stability (%) | | | | | | |
| | Volume Change | | | | | | |
| | 100° C. 1 day | | +2.1 | +2.0 | °2.3 | +2.5 | +2.4 |
| | 100° C. 7 days | | +3.8 | +3.7 | +3.9 | +4.8 | +5.0 |
| | 100° C. 14 days | | +3.9 | +4.0 | +4.2 | +5.2 | +5.5 |
| | −20° C. 1 day | | 0.0 | 0.0 | 0.0 | −0.1 | |
| | | | | | −0.2 | | |
| | −20° C. 7 days | | 0.0 | 0.0 | 0.0 | −0.5 | −0.4 |
| | −20° C. 14 days | | 0.0 | −0.1 | 0.0 | −0.6 | −0.7 |
| | Burning Test | | | | | | |
| | ASTM 1692-68 | | 8 | 4 | 7 | 100 | 88 |
| | Burning Distance (mm) | | | | | | |

*Parallel to Rise Direction
**Perpendicular to Rise Direction with reference to specific embodiments thereof, it will be apparent to one skilled in the art that various changes and modifications can be made therein without departing from the spirit and scope thereof.

What is claimed is:

1. A process for producing a flame resistant rigid polyurethane foam comprising reacting a mixture consisting of (i) a polyetherpolyol [and] *or* a polyesterpolyol, each having an active hydrogen atom, (ii) a polyisocyanate, said polyisocyanate being used in an amount of 0.5 to 3 equivalents per 1 equivalent of said polyetherpolyol [and] *or* polyesterpolypol, (iii) at least one blowing agent selected from water and a volatile foaming agent, said water when present being used in an amount of less than about 5% by weight and said volatile foaming agent when present being used in an amount of less than about 70% by weight, said weights being based on the total weight of the starting materials, (iv) an emulsifying agent, said emulsifying agent being used in an amount of less than about 2% by weight based on the total weight of the starting materials, and (v) at least one amine compound selected from general formulae (I), (II), (III), (IV), (V), (VI), and (VII):

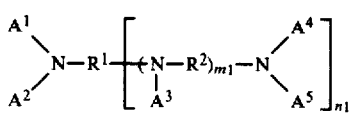

(I)

wherein $A^1$, $A^2$, $A^3$, $A^4$, and $A^5$ each represents a hydrogen atom or a monovalent organic group, wherein at least one of $A^1$ to $A^5$ being a hydrogen atom or an organic group which contains a hydrogen atom active to an isocyanate group; $R^1$ is a divalent organic group, a trivalent organic group or a tetravalent organic group; $R^2$ represents a divalent organic group; $m_1$ represents 0 or a positive integer smaller than 8; and $n_1$ represents 1, 2 or 3;

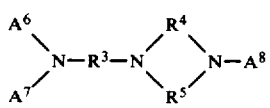

(II)

wherein $A^6$, $A^7$, and $A^8$ each represents a hydrogen atom or a monovalent organic group, with at least one of $A^6$ to $A^8$ being a hydrogen atom or an organic group which contains a hydrogen atom active to an isocyanate group; $R^3$, $R^4$ and $R^5$ each represents a divalent organic group;

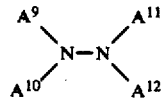

(III)

wherein $A^9$, $A^{10}$, $A^{11}$, and $A^{12}$ each represents a hydrogen atom or a monovalent organic group, with at least one of $A^9$ to $A^{12}$ being a hydrogen atom or an organic group which contains a hydrogen atom active to an isocyanate group;

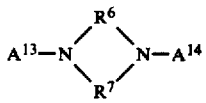

(IV)

wherein $A^{13}$ and $A^{14}$ each represents a hydrogen atom or a monovalent organic group, with at least one of $A^{13}$ and $A^{14}$ being a hydrogen atom or an organic group which contains a hydrogen atom active to a isocyanate group and $R^6$ and $R^7$ each represents a divalent organic group;

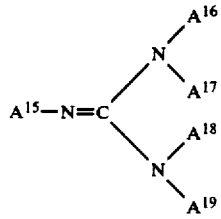

(V)

wherein $A^{15}$, $A^{16}$, $A^{17}$, $A^{18}$, and $A^{19}$ each represents a hydrogen atom or a monovalent organic group, with at least one of $A^{15}$ to $A^{19}$ being a hydrogen atom or an organic group which contains a hydrogen atom active to an isocyanate group;

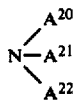

(VI)

wherein $A^{20}$, $A^{21}$ and $A^{22}$ each represents a hydrogen atom or a monovalent organic group, with at least one of $A^{20}$ to $A^{22}$ being a hydrogen atom or an organic group which contains a hydrogen atom active to an isocyanate group; and

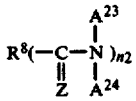

(VII)

wherein $R^8$ represents a hydrogen atom, a monovalent organic group, a divalent organic group, or a trivalent organic group; $A^{23}$ and $A^{24}$ each represents a hydrogen atom or a monovalent organic group, at least one of said $R^8$, $A^{23}$, and $A^{24}$ being a hydrogen atom or a group having a hydrogen atom active to an isocyanate group; Z represents an oxygen atom or a sulfur atom; and $n_2$ is an integer of 1 to 3, the weight ratio of said amine compound to said polyetherpolyol [and] *or* polyesterpolyol being from 7:3 to 3:7, said polyurethane foam being self-extinguishing with a burning distance of 14 to 22 mm as tested in accordance with ASTM D 1692–68.

2. The process as claimed in claim 1, wherein said groups for $A^1$ to $A^{24}$ are selected from the group consisting of a saturated or unsaturated alkyl group, aryl group, or alicyclic group.

3. The process as claimed in claim 2, wherein said alkyl, aryl or alicyclic groups are substituted with substituents, said substituents being an amino group, a hydroxyl group, a cyano group, a mercapto group or a halogen atom.

4. The process as claimed in 1, wherein said monovalent organic group contains therein a

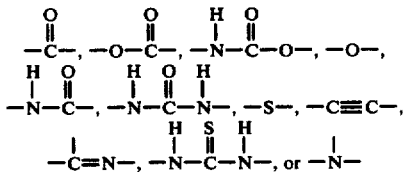

grouping.

5. The process as claimed in claim 1, wherein $A^1$ to $A^{24}$

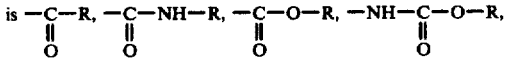

or —R'—O—R, wherein R represents a lower alkyl group or an aryl group and R' represents a lower alkylene group.

6. The process as claimed in claim 1, wherein $R^1$ is a divalent saturated or unsaturated alkylene group, arylene group, or alicyclic group, or a tri- or tetra-valent saturated or unsaturated aliphatic hydrocarbon group, aromatic hydrocarbon group, alicyclic hydrocarbon group or a heterocyclic group.

7. The process as claimed in claim 1, wherein $R^1$ and $R^2$ is selected from the group consisting of a saturated or unsaturated alkylene group, an arylene group, or a divalent alicyclic group.

8. The process as claimed in claim 1, wherein R' or $R^2$ is

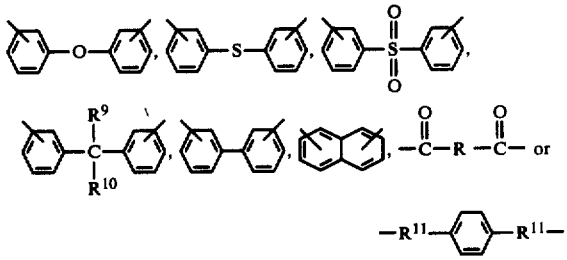

wherein $R^9$ and $R^{10}$ each represents a hydrogen atom or a lower alkyl group and $R^{11}$ represents an alkylene group.

9. The process as claimed in claim 1, wherein the divalent organic group represented by said $R^3$, $R^4$, $R^5$, $R^6$ and $R^7$ is a saturated or unsaturated alkylene group, an arylene group or a divalent alicyclic group.

10. The process as claimed in claim 1, wherein the organic group represented by said $R^8$ in the general formula (VII) is a monovalent, divalent or trivalent saturated or unsaturated aliphatic hydrocarbon group; an aromatic hydrocarbon group; an alicyclic group; in which each of said groups may be substituted by a saturated or unsaturated alkyl group, a hydroxyl group, or an aryl group; a

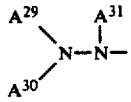

group; a —N=N— group; or a

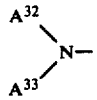

group; wherein $A^{29}$ to $A^{33}$ each represents an unsubstituted or substituted, saturated or unsaturated alkyl group, an aryl group, or an alicyclic group, said substituents for each of said alkyl, aryl, and alicyclic groups being a halogen atom, a hydroxyl group, a mercapto group, an amino group or a cyano group.

11. The process as claimed in claim 1, wherein said amine compounds is represented by the formulae (I), (II), (III) or (IV) wherein at least two groups of the monovalent groups represented by $A^1$ to $A^{14}$ are hydroxyl-containing groups.

12. The process as claimed in claim 1, wherein said amine compound is a mixture of an amine compound selected from the compounds (i) represented by the formulae (I), (II), (III), (IV), (V), (VI) and (VII) wherein at least one group of the monovalent organic groups represented by $A^1$ to $A^{24}$ is a hydrogen atom, and an amine compound selected from the compounds (ii) represented by the formulae (I), (II), (III), (IV), (V), (VI) and (VII) wherein all monovalent organic groups represented by $A^1$ to $A^{24}$ are hydroxyl-containing groups.

13. The process as claimed in claim 1, wherein said emulsifying agent is a silicone oil.

14. The process as claimed in claim 1, wherein said emulsifying agent is used in an amount less than about 2% by weight based on the weight of the total amount of starting materials.

15. The process as claimed in claim 1, wherein said mixture further contains at least one catalyst.

16. A flame resistant rigid polyurethane foam produced by the process as claimed in claim 1.

*17. A process for producing a flame resistant rigid polyurethane foam comprising reacting a mixture consisting of (i) a polyetherpolyol or a polyesterpolyol, each having an active hydrogen atom, (ii) a polyisocyanate, said polyisocyanate being used in an amount of 0.5 to 3 equivalents per 1 equivalent of said polyetherpolyol or polyesterpolyl, (iii) at least one blowing agent selected from water and a volatile foaming agent, said water when present being used in an amount of less than about 5% by weight and said volatile foaming agent when present being used in an amount of less than about 70% by weight, said weights being based on the total weight of the starting materials, (iv) an emulsifying agent, said emulsifying agent being used in an amount of less than about 2% by weight based on the total weight of the starting materials, and (v) at least one amine compound selected from general formula (I):*

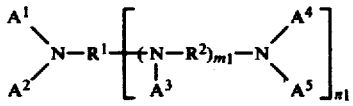

(I)

*wherein $A^1$, $A^2$, $A^3$, $A^4$, and $A^5$ each represents a hydrogen atom or a monovalent organic group, wherein at least one of $A^1$ to $A^5$ being a hydrogen atom or an organic group which contains a hydrogen atom active to an isocyanate group; $R^1$ is a divalent organic group, a trivalent organic group or a tetravalent organic group; $R^2$ represents a divalent organic group; $m_1$ represents 0 or a positive integer smaller than 8; and $n_1$ represents 1, 2 or 3; the weight ratio of said amine compound to said polyetherpolyol or polyesterpolyol being from 7:3 to 3:7, said polyurethane foam being self-extinguishing with a burning distance of 14 to 22 mm as tested in accordance with ASTM D 1692–68.*

* * * * *